United States Patent
Enbuske et al.

(10) Patent No.: US 11,849,420 B2
(45) Date of Patent: *Dec. 19, 2023

(54) SYSTEMS AND METHODS FOR SYNCHRONOUS CONTROL OF HARQ CONFIGURATIONS

(71) Applicant: TELEFONAKTIEBOLAGET LM ERICSSON (PUBL), Stockholm (SE)

(72) Inventors: Henrik Enbuske, Stockholm (SE); Gustav Wikström, Täby (SE); Torsten Dudda, Wassenberg (DE); Daniel Larsson, Lund (SE); Laetitia Falconetti, Järfälla (SE); Robert Karlsson, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 6 days.

This patent is subject to a terminal disclaimer.

(21) Appl. No.: 17/533,050

(22) Filed: Nov. 22, 2021

(65) Prior Publication Data
US 2022/0086788 A1 Mar. 17, 2022

Related U.S. Application Data

(62) Division of application No. 16/338,234, filed as application No. PCT/IB2017/056046 on Sep. 30, 2017, now Pat. No. 11,212,765.

(Continued)

(51) Int. Cl.
*H04W 56/00* (2009.01)
*H04L 1/1812* (2023.01)
(Continued)

(52) U.S. Cl.
CPC ....... *H04W 56/0055* (2013.01); *H04L 1/1812* (2013.01); *H04L 1/1854* (2013.01); *H04L 1/1864* (2013.01); *H04W 72/23* (2023.01)

(58) Field of Classification Search
CPC ............ H04W 56/0055; H04W 72/14; H04L 1/1812; H04L 1/1854; H04L 1/1864
See application file for complete search history.

(56) References Cited

U.S. PATENT DOCUMENTS 11,212,765 B2 * 12/2021 Enbuske ............... H04L 1/1864
2011/0149774 A1 6/2011 Chen et al.
(Continued)

FOREIGN PATENT DOCUMENTS

CN 101414900 A 4/2009
CN 101682488 A 3/2010
(Continued)

OTHER PUBLICATIONS

Samsung, Overview of Latency reduction operation with subframe TTI for FS1, R1-166692, 3GPP TSG RAN WG1 Meeting #86, Gothenburg, Sweden, Aug. 22-26, 2016.
(Continued)

*Primary Examiner* — Donald L Mills
(74) *Attorney, Agent, or Firm* — BAKER BOTTS L.L.P.

(57) ABSTRACT

According to certain embodiments, a method for synchronous control of timing configurations includes operating a wireless device according to a first timing configuration associated with a first delay duration for transmitting feedback to a network node. A second timing configuration associated with a second delay duration for transmitting feedback to the network node is received from the network node. The second delay duration is different from the first delay duration. In response to a first downlink transmission from the network node, a first feedback is scheduled for transmission at a transmission time determined based on the second delay duration associated with the second timing configuration.

26 Claims, 9 Drawing Sheets

Related U.S. Application Data

(60) Provisional application No. 62/402,295, filed on Sep. 30, 2016.

(51) Int. Cl.
*H04L 1/1829* (2023.01)
*H04W 72/23* (2023.01)

(56) References Cited

U.S. PATENT DOCUMENTS

| | | |
|---|---|---|
| 2013/0308464 A1 | 11/2013 | Park et al. |
| 2014/0086152 A1 | 3/2014 | Bontu et al. |
| 2015/0016432 A1 | 1/2015 | Meyer et al. |
| 2015/0365965 A1 | 12/2015 | Wu et al. |
| 2016/0099799 A1 | 4/2016 | Bashar et al. |
| 2016/0105905 A1 | 4/2016 | Vajapeyam |
| 2017/0339682 A1 | 11/2017 | Lee et al. |
| 2018/0014301 A1* | 1/2018 | Chen ............... H04L 1/1896 |
| 2018/0049046 A1 | 2/2018 | Lunttila et al. |
| 2018/0049226 A1* | 2/2018 | Chen ............... H04L 1/1861 |
| 2018/0077719 A1 | 3/2018 | Nory et al. |
| 2018/0242317 A1 | 8/2018 | Marinier et al. |
| 2018/0343047 A1 | 11/2018 | He et al. |
| 2019/0068334 A1 | 2/2019 | Stern-Berkowitz et al. |
| 2019/0342909 A1* | 11/2019 | Lee ............... H04W 72/1289 |
| 2019/0372721 A1 | 12/2019 | Lee et al. |
| 2020/0044781 A1 | 2/2020 | Rudolf et al. |
| 2020/0304248 A1* | 9/2020 | Lunttila ............... H04L 1/1854 |

FOREIGN PATENT DOCUMENTS

| | | |
|---|---|---|
| CN | 102656836 A | 9/2012 |
| CN | 105933100 A | 9/2016 |
| JP | 2015180098 A | 10/2015 |

OTHER PUBLICATIONS

3GPP "3rd Generation Partnership Project; Technical Specification Group Radio Access Network; Evolved Universal Terrestrial Radio Access (E-UTRA); Physical layer procedures (Release 14)", TS 36.213 V14.0.0, Sep. 2016.

Nokia et al., Mechanism for indicating the processing time to the UE for 1 ms TTD, 3GPP TSG-RAN WG1 Meeting #86, R1-167084, Gothenburg, Sweden Aug. 22-26, 2016.

Nokia et al., Simultaneous Transmissions of UL Signals for Shortened TTD Operation, 3GPP TSG RAN WG1 Meeting #86, R1-167019, Gothenburg, Sweden Aug. 22-26, 2016.

Qualcomm Incorporated, Shortened Processing time for Downlink 1ms TTI, 3GPP TSG RAN WG1 #86, R1-166307, Gothenburg Sweden Aug. 22-26, 2016.

Samsung, FDD DL HARQ-ACK feedback procedure for latency reduction with subframe TTI, 3GPP TSG RAN WG1 Meeting #86, R1-166696, Gothenburg, Sweden, Aug. 22-26, 2016.

* cited by examiner

SYSTEMS AND METHODS FOR SYNCHRONOUS CONTROL OF HARQ CONFIGURATIONS

RELATED APPLICATIONS

This application is a division of U.S. application Ser. No. 16/338,234, filed Sep. 30, 2017, which is a 371 of International Application No. PCT/IB2017/056046, filed Sep. 30, 2017, which claims the benefit of U.S. Provisional Application No. 62/402,295, filed Sep. 30, 2016, the disclosures of which are fully incorporated herein by reference.

TECHNICAL FIELD

The present disclosure relates, in general, to wireless communications and, more particularly, systems and methods for synchronous control of Hybrid Automatic Repeat Request (HARQ) timing configuration.

BACKGROUND

Packet data latency is one of the performance metrics that vendors, operators, and end-users via speed test applications regularly measure. Latency measurements may be done in all phases of a radio access network system lifetime. As examples, latency measurements may be performed when verifying a new software release or system component, when deploying a system, and/or when the system is in commercial operation. Better latency was one performance metric that guided the design of Long Term Evolution (LTE). Specifically, a goal was to improve the latency of LTE relative to previous generations of 3GPP RATs. LTE is also now recognized by the end-users to be a system that provides faster access to internet and lower data latencies than previous generations of mobile radio technologies.

Packet data latency is important not only for the perceived responsiveness of the system; it is also a parameter that indirectly influences the throughput of the system. HTTP/TCP is the dominating application and transport layer protocol suite used on the internet today. According to HTTP Archive (http://httparchive.org/trends.php), the typical size of HTTP based transactions over the internet are in the range of a few 10's of Kbyte up to 1 Mbyte. In this size range, the transmission control protocol (TCP) slow start period is a significant part of the total transport period of the packet stream. During TCP slow start the performance is latency limited. Thus, improved latency can rather easily be showed to improve the average throughput, for this type of TCP based data transactions.

Radio resource efficiency could be positively impacted by latency reductions. Lower packet data latency could increase the number of transmissions possible within a certain delay bound. Thus, higher block error ratio (BLER) targets could be used for the data transmissions freeing up radio resources potentially improving the capacity of the system.

There are a number of current applications that will be positively impacted by reduced latency in terms of increased perceived quality of experience. Examples include gaming, real-time applications like VoLTE/OTT VoIP, and multi-party video conferencing. Going into the future, there will be a number of new applications that will be more delay critical. Examples may include remote control/driving of vehicles, augmented reality applications such as in, for example, smart glasses or specific machine communications requiring low latency. Reduced latency of data transport may also indirectly give faster radio control plane procedures like call set-up/bearer set-up, due to the faster transport of higher layers control signalling.

LTE is a radio access technology based on radio access network control and scheduling. These facts impact the latency performance since a transmission of data need a round trip of lower layer control signalling. FIG. 1 illustrates control signalling timing for scheduling requests. As depicted, the data is created by higher layers at T0. The UE modem then sends a scheduling request (SR) to the eNodeB (eNB), and the eNB processes this SR and responds with a grant so the data transfer can start at T6. Accordingly, one area to address when it comes to packet latency reductions is the reduction of transport time of data and control signalling and the reduction of processing time of control signalling. Transport time of data and control signalling may be reduced by addressing the length of a transmission time interval (TTI). Processing time of control signalling may be reduced by reducing the time it takes for a user equipment (UE) to process a grant signal.

In a typical UE design, the UE will receive the entire subframe before processing is started. Due to the channel estimation, there may be some look-ahead of cell reference signals in the following subframe, which will introduce a delay of one or a few symbols. Then, the demodulation and generation of soft values will take place, followed by turbo decoding. The time these blocks will take will be dependent on the size of the transport blocks and the processing chain of the UE, which is designed to allow for reception of the worst-case scenario with maximum allocation, modulation and code rate including possibly on a number aggregated component carriers. The UE needs to be finished with all these blocks with an additional margin as given by the maximum timing advance value.

The timing advance is configured from the network to make the signals from different UEs arrive at the eNB at similar time instants and can, for large cell sizes, be specified to values up to 0.7 ms, corresponding to the round-trip time of a cell radius of about 100 km.

For a UE supporting reduced processing timing, benefits are expected in terms of acceleration of TCP slow-start phase due to shorter delay before the TCP acknowledgment (TCP ACK) transmission, in terms of reduced latency and also in terms of increased uplink (UL) performance due to shorter idle time between the UL grant and the actual UL transmission. Thus, one way to reduce the latency is by reduction of maximum timing advance (TA). Currently, the maximum TA, 0.67 Ms, is dimensioned for a maximum cell size of 100 km. For operation aiming at UEs in good coverage, this level is unnecessary for UEs supporting a reduced in processing time.

Note that a 1 Ms TTI operation with reduced processing time does not only address UE in good coverage but should also be suited for large cell deployments. Reducing maximum TA by half to a maximum of 0.33 ms may still support cell sizes of 50 km, which should be sufficient for 1 ms TTI operation with reduced processing time and sTTI operation.

In current LTE Rel-13, the UE transmits a HARQ acknowledgment (HARQ-ACK) for frequency division duplex (FDD) in sub-frame n for a detected physical data shared channel (PDSCH) in sub-frame n−4. Similarly, a HARQ-ACK received by physical HARQ indication channel (PHICH) in subframe i is associated to physical uplink shared channel (PUSCH) transmission in subframe i−4 for frequency division duplex (FDD). Similar requirements for UL and downlink (DL) are given for time division duplex (TDD). This mechanism is a fundamental capability in the current standard. However, as a result of reduced processing, the uplink/downlink HARQ timing may be made differently. For example, for an uplink transmission in sub-frame n+4 configured by physical downlink control channel (PDCCH), enhanced PDCCH (EPDCCH), or PHICH transmission in sub-frame n, the delay may be reduced from four subframes to a shorter value in order to reduce latency. In introducing the support for reduced processing, it can be envisioned that UE capability signalling is introduced, and that the NW by explicit or implicit configuration signalling may use the reduced processing capability to reduce latency.

The simplest result from the reduced latency is that TCP acknowledgements may be delivered faster with the reduced HARQ round trip time (RTT). For example, when a file transmission starts that it is not contiguous to previous file transmission, the link adaptation starts either with or without channel quality information (CQI). In either case, in the beginning (slow start period), the outer loop link adaptation (OLLA) has not yet tuned the MCS to a level that matches the channel. Consequently, more retransmissions are needed in this phase. If, for example, a TCP acknowledgment (TCP ACK) is lost over the air, the retransmission happens faster. In addition, when the scheduler receives acknowledgments more often it may tune the MCS to match the channel faster.

FIG. 2 illustrates existing HARQ acknowledgment/negative-acknowledgement (HARQ ACK/NACK) timing. The present DL scheduling is done on a 1 ms subframe basis. The processing time allowed to the terminal is 3 ms minus the timing advance, meaning that the HARQ ACK/NACK in response to a PDSCH transmission in subframe n should be transmitted in the UL in subframe n+4, no matter the size of the transport block or when the assignment ends. This is wasteful since if the processing time required for the terminal is much smaller, it is in principle able to transmit the ACK/NACK feedback earlier than what is possible for the case when all symbols in the subframe are used.

SUMMARY

To address the foregoing problems with existing solutions, disclosed are systems and methods for synchronous control of timing configurations.

According to certain embodiments, a method for synchronous control of timing configurations includes operating a wireless device according to a first timing configuration associated with a first delay duration for transmitting feedback to a network node. A second timing configuration associated with a second delay duration for transmitting feedback to the network node is received from the network node. The second delay duration is different from the first delay duration. In response to a first downlink transmission from the network node, a first feedback is scheduled for transmission at a transmission time determined based on the second delay duration associated with the second timing configuration.

According to certain embodiments, a wireless device for synchronous control of timing configurations includes memory storing instructions and processing circuitry operable to execute the instructions to cause the wireless device to operate according to a first timing configuration associated with a first delay duration for transmitting feedback to a network node. A second timing configuration associated with a second delay duration for transmitting feedback to the network node is received from the network node. The second delay duration being different from the first delay duration. In response to a first downlink transmission from the network node, a first feedback is scheduled for transmission at a transmission time determined based on the second delay duration associated with the second timing configuration.

According to certain embodiments, a method by a network node for synchronous control of timing configurations includes transmitting, to a wireless device, a first timing configuration associated with a first delay duration for transmitting feedback to the network node. A second timing configuration associated with a second delay duration for transmitting feedback is transmitted to the wireless device. The second delay duration being different than the first delay duration for transmitting feedback.

According to certain embodiments, a network node for synchronous control of timing configurations includes memory storing instructions and processing circuitry operable to execute the instructions to cause the network node to transmit, to a wireless device, a first timing configuration associated with a first delay duration for transmitting feedback to the network node. A second timing configuration associated with a second delay duration for transmitting feedback is transmitted to the wireless device. The second delay duration being different than the first delay duration for transmitting feedback.

Certain embodiments of the present disclosure may provide one or more technical advantages. For example, according to certain embodiments, a wireless device supporting reduced processing may be dynamically switched between two or more uplink and/or downlink transmission and HARQ timing modes and/or configurations. A technical advantage may be reduced HARQ acknowledgement/negative-acknowledgment (HARQ-ACK/NACK) time and uplink (UL) grant timing. As a result, more efficient operation for latency sensitive transmissions may be provided. Another technical advantage may be that certain embodiments allow dynamic switching between different HARQ timing configurations so that the best time interval can be used. As a result, data loss may be avoided, and increased latency for data transmission during this transition phase may be significantly avoided.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

To address problems with existing solutions related to Hybrid Automatic Repeat Request (HARQ) timing/configurations, systems and methods are disclosed for synchronous control of timing configurations. Some of the embodiments contemplated herein will now be described more fully with reference to the accompanying drawings. Specifically, particular embodiments are described in FIGS. 1-9 of the drawings, like numerals being used for like and corresponding parts of the various drawings. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Figure 3:
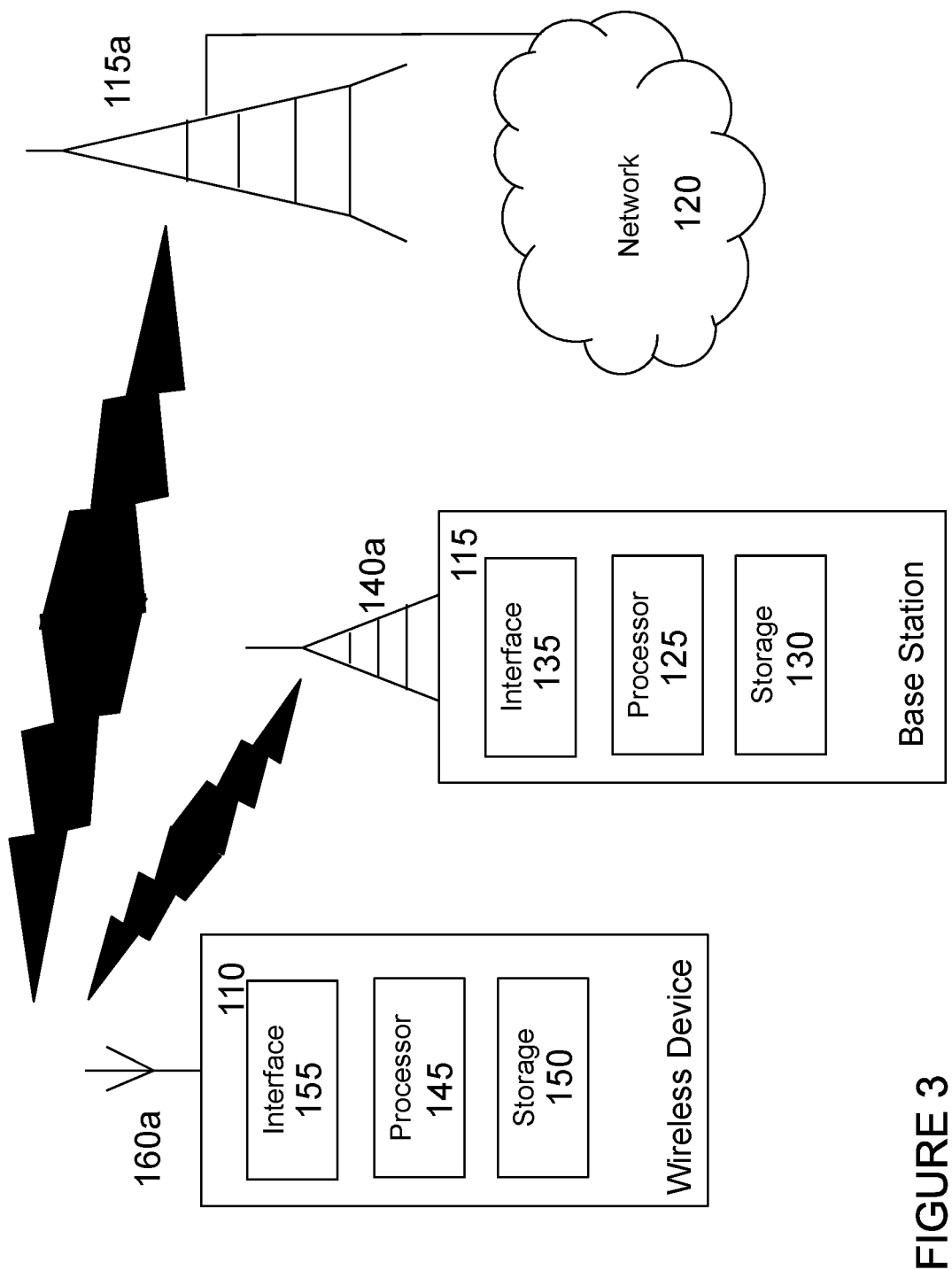
FIG. 3 illustrates an example wireless communication network for synchronous control of timing configurations, in accordance with certain embodiments.

Although the solutions described herein may be implemented in any appropriate type of system using any suitable components, particular embodiments of the described solutions may be implemented in a wireless network. FIG. 3 is a block diagram illustrating an example embodiment of a wireless communication network 100 for synchronous control of timing configurations, in accordance with certain embodiments. In the example embodiment, wireless communication network 100 provides communication and other types of services to one or more wireless devices 110. In the illustrated embodiment, the wireless communication network 100 includes one or more instances of network nodes 115 that facilitate the wireless devices' access to and/or use of the services provided by the wireless communication network 100. The wireless communication network 100 may further include any additional elements suitable to support communication between wireless devices 110 or between a wireless device 110 and another communication device, such as a landline telephone.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network 1001 may represent any type of communication, telecommunication, data, cellular, and/or radio network or other type of system. In particular embodiments, the wireless communication network 100 may be configured to operate according to specific standards or other types of predefined rules or procedures. Thus, particular embodiments of the wireless communication network 100 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

For simplicity, FIG. 3 depicts only network 120, network nodes 115 and 115a, and wireless device 110. Network node 115 comprises processor 125, storage 130, interface 135, and antenna 140a. Similarly, wireless device 110 comprises processor 145, storage 150, interface 155 and antenna 160a. These components may work together in order to provide network node 115 and/or wireless device 110 functionality, such as providing wireless connections in a wireless communication network 100. In different embodiments, the wireless communication network 100 may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device 110 and/or with other equipment in the wireless communication network 100 that enable and/or provide wireless access to the wireless device 110. Examples of network nodes 115 include, but are not limited to, access points (APs), in particular radio access points. A network node 115 may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS). In a particular embodiment, a base station may be a relay node or a relay donor node controlling a relay.

Yet further examples of network nodes 115 include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes 115 may represent any suitable device (or group of devices) capable, configured, arranged, and/or operable to enable and/or provide a wireless device 110 access to the wireless communication network 100 or to provide some service to a wireless device 110 that has accessed the wireless communication network 100.

As used herein, the term "radio node" is used generically to refer both to wireless devices 110 and network nodes 115, as each is respectively described above.

As described above, network node 115 comprises processor 125, storage 130, interface 135, and antenna 140a. These components are depicted as single boxes located within a single larger box. In practice however, a network node 115 may comprises multiple different physical components that make up a single illustrated component (e.g., interface 135 may comprise terminals for coupling wires for a wired connection and a radio transceiver for a wireless connection). As another example, network node 115 may be a virtual network node in which multiple different physically separate components interact to provide the functionality of network node 115. For example, processor 125 may comprise three separate processors located in three separate enclosures, where each processor is responsible for a different function for a particular instance of network node 115. Similarly, network node 115 may be composed of multiple physically separate components. As examples, network node 115 may be composed of a NodeB component and a RNC component, a BTS component and a BSC component, or other suitable components, which may each have their own respective processor, storage, and interface components. In certain scenarios in which network node 115 comprises multiple separate components, one or more of the separate components may be shared among several network nodes 115. For example, a single RNC may control multiple NodeB's. In such a scenario, each unique NodeB and BSC pair, may be a separate network node 115. In some embodiments, network node 115 may be configured to support multiple radio access technologies (RATs). In such embodiments, some components may be duplicated and some components may be reused. For example, separate storage 130 may be included for each of the different RATS, in a particular embodiment. As another example, the same antenna 140a may be shared by the different RATS, in a particular embodiment.

Processor 125 may be a combination of one or more of a microprocessor, controller, microcontroller, central processing unit, digital signal processor, processing circuitry, application specific integrated circuit, field programmable gate array, or any other suitable computing device, resource, or combination of hardware, software and/or encoded logic operable to provide, either alone or in conjunction with other network node 115 components such as storage 130, network node 115 functionality. For example, processor 125 may execute instructions stored in storage 130. Such functionality may include providing various wireless features discussed herein to a wireless devices, such as wireless device 110, including any of the features or benefits disclosed herein.

Storage 130 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 115. Storage 130 may be used to store any calculations made by processor 125 and/or any data received via interface 135.

According to certain embodiments, interface 135 may be used in the wired or wireless communication of signalling and/or data between network node 115, network 120, and/or wireless device 110. For example, interface 135 may perform any formatting, coding, or translating that may be needed to allow network node 115 to send and receive data from network 120 over a wired connection. Interface 135 may also include a radio transmitter and/or receiver that may be coupled to or a part of antenna 140a. The radio may receive digital data that is to be sent out to other network nodes or wireless devices via a wireless connection. The radio may convert the digital data into a radio signal having the appropriate channel and bandwidth parameters. The radio signal may then be transmitted via antenna 140a to the appropriate recipient such as, for example, wireless device 110.

Antenna 140a may be any type of antenna capable of transmitting and receiving data and/or signals wirelessly. In some embodiments, antenna 140a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device 110 may represent a UE configured for communication in accordance with one or more communication standards promulgated by the $3^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device 110 may support device-to-device (D2D) communication, for example by implementing a 3GPP standard for sidelink communication, and may in this case be referred to as a D2D communication device.

As yet another specific example, in an Internet of Things (IOT) scenario, a wireless device 110 may represent a machine or other device that performs monitoring and/or measurements, and transmits the results of such monitoring and/or measurements to another wireless device 110 and/or a network node 115. The wireless device 110 may in this case be a machine-to-machine (M2M) device, which may in a 3GPP context be referred to as a machine-type communication (MTC) device. As one particular example, the wireless device 110 may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device 110 may represent a vehicle or other equipment that is capable of monitoring and/or reporting on its operational status or other functions associated with its operation.

A wireless device 110 as described above may represent the endpoint of a wireless connection, in which case the device may be referred to as a wireless terminal. Furthermore, a wireless device 110 as described above may be mobile, in which case it may also be referred to as a mobile device or a mobile terminal.

As depicted in FIG. 3, wireless device 110 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node 115 and/or other wireless devices. Wireless device 110 comprises processor 145, storage 150, interface 155, and antenna 160a. Like network node 115, the components of wireless device 110 are depicted as single boxes located within a single larger box, however in practice a wireless device may comprises multiple different physical components that make up a single illustrated component. For example, storage 150 may comprise multiple discrete microchips, each microchip representing a portion of the total storage capacity.

Processor 145 may be a combination of one or more of a microprocessor, controller, microcontroller, central processing unit, digital signal processor, processing circuitry, application specific integrated circuit, field programmable gate array, or any other suitable computing device, resource, or combination of hardware, software and/or encoded logic operable to provide, either alone or in combination with other wireless device 110 components, such as storage 150, wireless device 110 functionality. Such functionality may include providing various wireless features discussed herein, including any of the features or benefits disclosed herein.

Storage 150 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 150 may store any suitable data, instructions, or information, including software and encoded logic, utilized by wireless device 110. Storage 150 may be used to store any calculations made by processor 145 and/or any data received via interface 155.

Interface 155 may be used in the wireless communication of signalling and/or data between wireless device 110 and network node 115. For example, interface 155 may perform any formatting, coding, or translating that may be needed to allow wireless device 110 to send and receive data from network node 115 over a wireless connection. Interface 155 may also include a radio transmitter and/or receiver that may be coupled to or a part of antenna 160a. The radio may receive digital data that is to be sent out to network node 115 via a wireless connection. The radio may convert the digital data into a radio signal having the appropriate channel and bandwidth parameters. The radio signal may then be transmitted via antenna 140a to network node 115.

Antenna 160a may be any type of antenna capable of transmitting and receiving data and/or signals wirelessly. In some embodiments, antenna 160a may comprise one or more omni-directional, sector or panel antennas operable to transmit/receive radio signals between 2 GHz and 66 GHz. For simplicity, antenna 160a may be considered a part of interface 155 to the extent that a wireless signal is being used.

Figure 1:
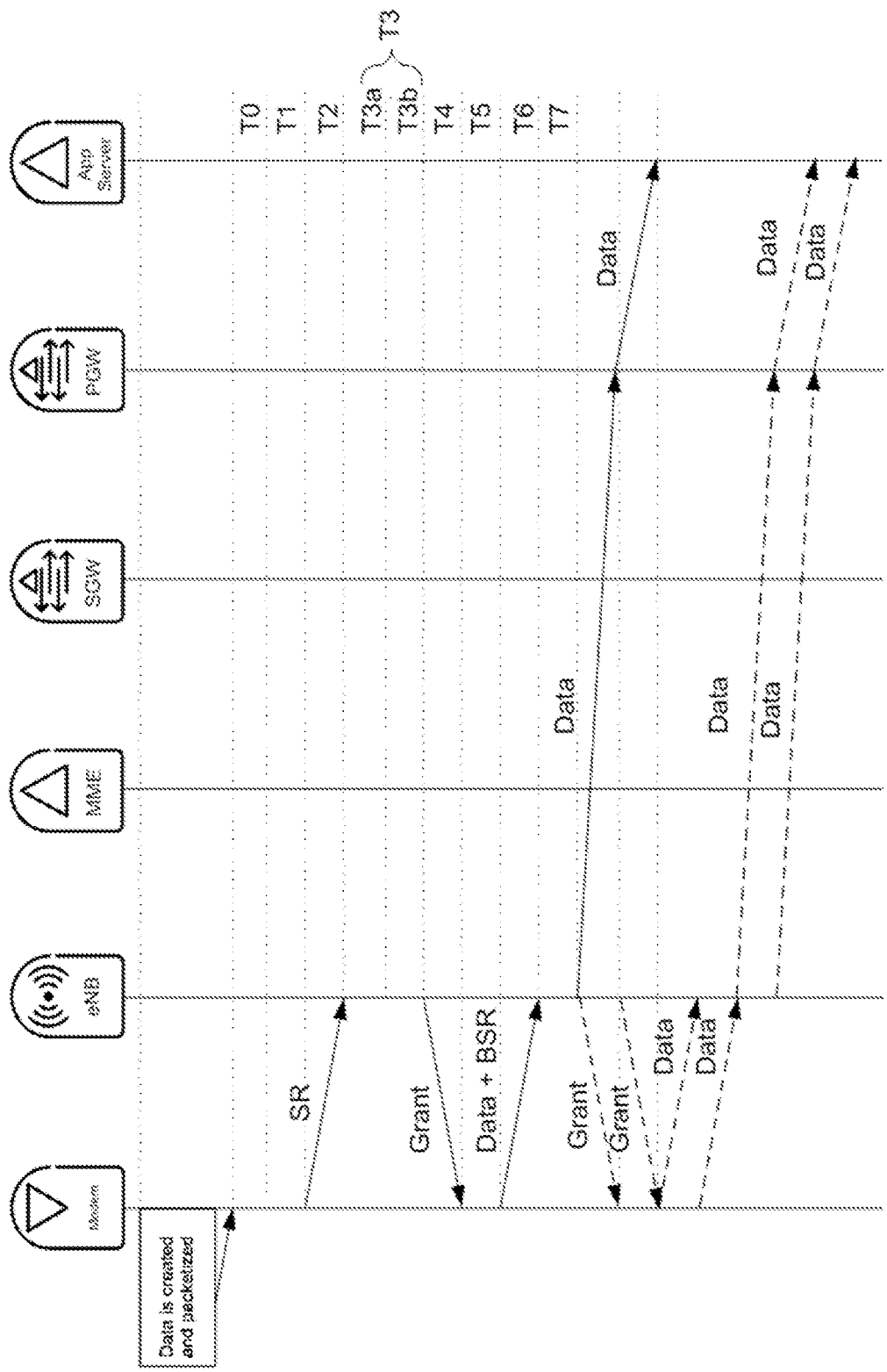
FIG. 1 illustrates control signaling timing for scheduling requests.
Figure 2:
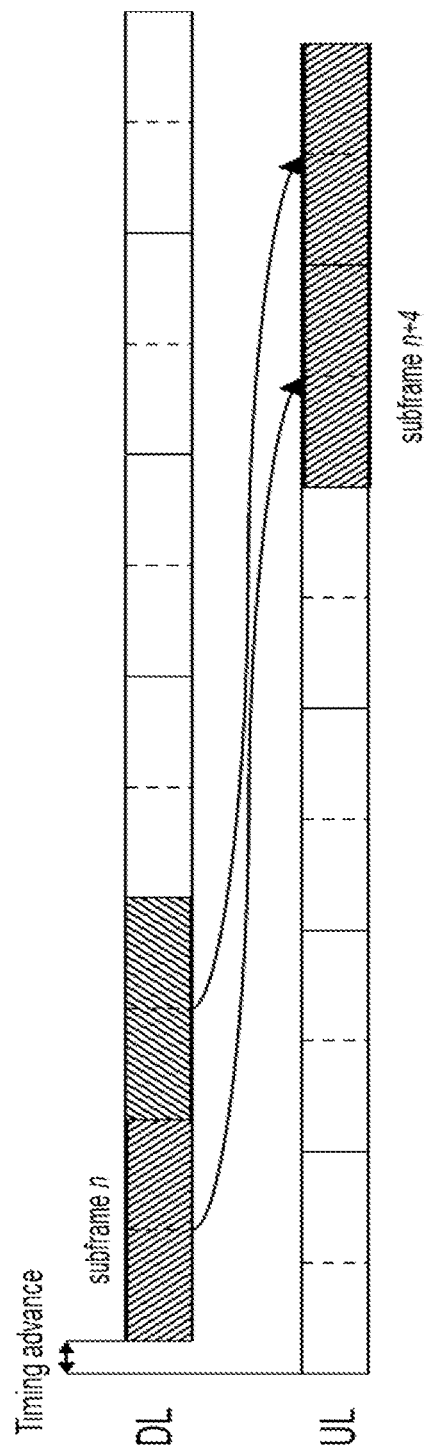
FIG. 2 illustrates existing Hybrid Automatic Repeat Request acknowledgement/negative-acknowledgment (HARQ ACK/NACK) timing.

Although FIG. 1 illustrates a particular arrangement of wireless communication network 100, the present disclosure contemplates that the various embodiments described herein may be applied to a variety of networks having any suitable configuration. Other example embodiments of network nodes 115, wireless devices 110, and other network nodes are described in more detail with respect to FIGS. 4 and 7, respectively. In certain embodiments, wireless communication device 110, network node 120, and core network node 130 use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies. However, the scope of the disclosure is not limited to the examples and other embodiments could use different radio access technologies.

According to certain embodiments, wireless device 110 is capable of supporting reduced processing time and/or short transmission time interval (TTI). The respective configurations may be indicated via radio resource control (RRC) capability exchange. Thus, in a particular embodiment, network node 115 may reconfigure the wireless device 110 to use reduced processing time and/or short TTI via a RRC reconfiguration message. Since the exact timing when wireless device 110 activates and starts using this RRC reconfiguration is undefined, a separate indication to activate the new configuration may be required. In this manner, network node 115 and wireless device 110 may become synchronized as to when wireless device 110 applies or starts applying the new configuration. How this indication may be realized and how issues related to the transition between the two configurations may be solved is discussed below.

According to certain embodiments, wireless device 110 may determine the HARQ timing and UL transmission time for the physical uplink shared channel (PUSCH) and acknowledgment/negative-acknowledgment (ACK/NACK) feedback to be transmitted in response to the signalling, indication, or format of the physical data control channel (PDCCH), enhanced physical data control channel (EPDCCH), or physical data shared channel (PDSCH) transmission. In a particular embodiment, the HARQ timing and UL transmission time may be determined from a set of used orthogonal frequency division multiple access (OFDM) symbols within the DL subframe and the transmission time and type of the control channel used to signal the resource assignment.

When the shorter processing configuration n+k is indicated, the time to the ACK/NACK feedback may be shorter as compared to the case with a default resource assignment for the subframe. It is also noted that ACK/NACKs from PDSCH transmissions in different DL subframes may be transmitted simultaneously in the UL, for example through ACK/NACK multiplexing or ACK/NACK bundling.

As compared to existing HARQ ACK/NACK timing, more exact timing rules are proposed herein to enable timely HARQ ACK/NACK feedback and thus latency benefits. According to particular embodiments, for example, wireless device 110 may be dynamically switched between two or more/several UL/DL transmission and HARQ timing modes/configurations by any one or more of the following:

- Using a UE-specific identity on a downlink control channel (e.g. SP-C-RNTI PDCCH/EPDCCH)
- Using a UE common identity on a downlink control channel (e.g. Group RNTI PDCCH/EPDCCH)
- Using a special format of Downlink Control Information
- Using a control field or header in DL packet data unit (e.g. MAC Control Element)

According to certain embodiments, a short processing identity (SP-C-RNTI) may be defined over RRC. According to certain embodiments, the shorter timing relation n+k1 is different from and, in a particular embodiment may be shorter than, a previously defined timing relation, which may have been predefined or RRC configured. This default timing n+k0 may be shorter than the current legacy timing n+4.

According to a particular embodiment, the switch to a shorter timing n+k1 may be done by toggling. For example, one control message may be scrambled and transmitted with the short processing SP-C-RNTI. After receiving the message, which may be a special activation message or a normal DCI message, in particular embodiments, wireless device 110 may use the shorter timing n+k1 when receiving DCI scrambled with C-RNTI until wireless device 110 receives another message with the default timing n+k0 scrambled with SP-C-RNTI. In a particular embodiment, wireless device 110 may send an acknowledgement of the timing toggle in the form of a MAC control element.

According to another embodiment, the switch to shorter timing n+k1 may be done using individual indications. For example, DCI scrambled with the short processing SP-C-RNTI may be transmitted. For each message scrambled with SP-C-RNTI, wireless device 110 may use the short processing time n+k1. Conversely, for each message scrambled with C-RNTI, wireless device 110 will use the default processing time n+k0.

Multiple timing relations can be defined by defining multiple SP-C-RNTI addresses. For example, multiple addresses such as SP1-C-RNTI, SP2-C-RNTI, and so on may be defined. The toggling or individual indication as described above may then be extended to the multiple timing relations n+k1 and n+k2, e.g. n+3 and n+2 timing.

According to certain embodiments for DL, at the transition point between n+4 and n+3 processing, HARQ feedback for DL might overlap. Table 1 illustrates the problem of collision of DL HARQ feedback for processes acting according to legacy n+4 timing and new n+3 timing:

TABLE 1

| TTI | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| DL TX |  |  |  | 0 | 1 | 2 | 3 | 4 | 5 | 6 | 7 | 0 | 1 | 2 | 3 | 4 | 5 | 6 | 7 | 0 | 1 | 2 |
| Feedback n+4 |  |  |  |  |  |  |  | 0 | 1 | 2 | 3 | 4 | 5 |  |  |  |  |  |  |  |  |  |
| Feedback n+3 |  |  |  |  |  |  |  |  |  |  |  |  | 6 | 7 | 0 | 1 | 2 | 3 | 4 | 5 | 6 | 7 |

As shown, for an indication to change at TTI 9, the first transmission indicating n+3 occurs in TTI 12.

For example, the signalling may be as follows for a toggling indication received at TTI X:

DL HARQ process at X−1 sends feedback at X−1+4, i.e. X+3, according to legacy timing DL HARQ process at X sends feedback at X+3, according to new timing According to various embodiments, the collision can be solved by:

Asynchronous HARQ, i.e. the HARQ process ID to be used is indicated via PDCCH

DL HARQ Feedback multiplexing on PUCCH, i.e. a PUCCH format at X+3 is used, which can carry feedback for both process at X−1 and X.

DL HARQ Feedback bundling on PUCCH, i.e., the feedback sent for a codeword is ACK only if both codewords at HARQ process at X−1 and HARQ process at X is correctly received.

Synchronous DL HARQ with priority rule which feedback is sent at X+3. The wireless device may be configured to only send feedback for either process from X−1 or X. In this case, the network node may assume the process as NACK (i.e. cannot use it for a new data transmission at the next opportunity, but would need to schedule a retransmission).

When implemented by the network node, the network node 115 may not schedule a DL HARQ transmission at X−1 when the network node 115 intends to switch from n+4 to n+3 mode at X.

Ignoring DL HARQ data received at X. Wireless device 110 may ignore the DL HARQ process data received at X, so that it also does not send feedback at X+3. This way the process started at X−1 with the legacy timing is prioritized at X+3. The eNB could send e.g. only padding or MAC control at X (i.e. no data).

According to certain embodiments for UL, at the transition point between n+4 and n+3 processing, UL transmissions and HARQ feedback transmissions for UL transmissions might overlap. Table 2 illustrates the problem of colliding UL transmissions and feedback for transition between N+4 and N+3 timing.

TABLE 2

| TTI | 0 | 1 | 2 | 3 | 4 | 5 | 6 | 7 | 8 | 9 | 10 | 11 | 12 | 13 | 14 | 15 | 16 | 17 | 13 | 19 | 20 | 21 |
|---|---|---|---|---|---|---|---|---|---|---|---|---|---|---|---|---|---|---|---|---|---|---|
| UL Grant TX | 0 | 1 | 2 | 3 | 4 | 5 | 6 | 7 |   |   |   | 0 | 1 | 2 | 3 | 4 | 5 | 6 | 7 | 0 | 1 | 2 |
| UL TX at n + 4 |   |   |   |   | 0 | 1 | 2 | 3 |   |   |   | 4 | 5 |   |   |   |   |   |   |   |   |   |
| Feedback at TX n + 4 |   |   |   |   |   |   |   |   |   |   |   | 0 | 1 | 2 | 3 | 4 | 5 |   |   |   |   |   |
| UL TX at n + 3 |   |   |   |   |   |   |   |   |   |   |   | 6 | 7 | 0 | 1 | 2 | 3 | 4 | 5 | 6 | 7 |   |
| Feedback at TX n + 3 |   |   |   |   |   |   |   |   |   |   |   |   |   |   | 6 | 7 | 0 | 1 | 2 | 3 | 4 |   |

As shown, for a transition from n+4 to n+3 at TTI 9, the UL transmissions and feedback collide at TTI 9.

More specifically, the signalling may be as follows:
UL HARQ process granted (or Nacked) at X−1 transmits at X−1+4, i.e. X+3, according to legacy timing
UL HARQ process granted at X transmits at X+3, according to new timing
UL HARQ process granted (or NACK'ed) at X−1 expects feedback at X−1+8, i.e. X+7, according to legacy timing
UL HARQ process granted (or Nacked) at X−1 expects feedback at X−2+8, i.e. X+6, according to legacy timing
UL HARQ process granted at X expects feedback at X+6, i.e. X+6, according to new timing
UL HARQ process granted at X+1 expects feedback at X+1+6, i.e. X+7, according to new timing According to certain embodiments, it may be possible to avoid overlap of UL transmissions and overlap of HARQ feedback for UL transmissions by letting the UL HARQ process granted at X override the process granted at X−1. Alternatively, and according to particular embodiments, the collision can be solved by one or more of the following methods:

Asynchronous HARQ. For example, the HARQ process ID to be used may be indicated via PDCCH, where asynchronous HARQ is applied for both n+4 and n+3 operations.

Asynchronous HARQ for n+3 operation. For example, the HARQ process ID to be used may be indicated via PDCCH, and a specified mapping between subframe or TTI and HARQ process ID may be known to both the network node 115 and the wireless device 110. In a particular embodiment, the n+4 operation uses synchronous HARQ and may be scheduled either via USS or CSS with the existing UL DCI formats. To be able to switch between the n+3 and n+4 operation, the mapping between subframe and HARQ process ID may be very important so that remaining data in HARQ process ID's buffer before the timing change can be properly scheduled and transmitted after the timing change.

The following gives an example mapping between subframe and HARQ process ID. In the example, it is assumed that there are $n_p$ HARQ processes per transport block and their ID is represented by a field of $\log_2(n_p)$ bits in the UL DCI applying asynchronous HARQ. So 00 . . . 0 is HARQ process ID 0, while 11 . . . 1 is HARQ process ID $n_p$−1. In LTE, a radio frame is composed of 20 slots, which are grouped in pairs to build 10 subframes. Using the notations of TS36.211, for example, the slot number within a radio frame may be denoted $n_s$ where $n_s \in \{0, 1, \ldots 19\}$ for a 15 kHz subcarrier spacing. If the system frame number is given by $n_f$, the absolute subframe number is $$n_{sf}^{abs} = 10 n_f + \left\lfloor \frac{n_s}{2} \right\rfloor,$$

where $\lfloor \ \rfloor$ is the floor operation. The proposed subframe to HARQ process ID mapping for the synchronous HARQ operation after switching from n+3 to n+4 timing may be expressed as follows. Given a system frame number and a slot number, the HARQ process ID to be served in a given subframe is $$P = \mathrm{mod}\left(10 n_f + \left\lfloor \frac{n_s}{2} \right\rfloor, n_p\right).$$

Two separate sets of HARQ processes may be maintained, one for the n+3 operation and one for the n+4 operation. When switching from n+3 to n+4 or vice-versa, the corresponding set of HARQ processes (and HARQ buffer) is used for scheduling, transmission, and data storage. This means that after the change to a different timing potential remaining buffer in the HARQ processes of the previous set is not scheduled and transmitted anymore. It may be scheduled and transmitted again only after a change back to the previous timing. A timer ensures that upon its expiration potential remaining data in the HARQ buffers of the inactive set of HARQ processes is pushed back to the higher layer such as, for example, RLC. This may affect the latency of the overall transmission.

A priority rule in the wireless device may define whether the UL transmission is done according to grant (from X−1 or X). Note that a NACK may have also been received for process from X−1. In a particular embodiment, the HARQ buffer of the non-prioritized process must be kept. Specifically, the HARQ buffer of the previously NACK'ed process from X−1 must be kept. Therefore, the wireless device 110 may assume an ACK for this non-prioritized process. A retransmission may be scheduled later. The prioritized process may be considered for UL transmission.

When implemented by network node 115, the network node 115 may not schedule or grant a UL HARQ transmission at X−1 when the network node intends to switch from n+4 to n+3 mode at X. If an UL HARQ process is already ongoing, the network node may proactively indicate ACK for the UL process, so that no retransmission takes place at X+3.

Ignoring DL HARQ data received at X. The wireless device 110 may ignore the DL HARQ process data received at X, so that it also does not send feedback at X+3. This way the process started at X−1 with the legacy timing is prioritized at X+3. The eNB could send e.g. only padding or MAC control at X (i.e. no data).

According to still other embodiments, at the expected feedback indications, a rule in the wireless device 110 may be defined, according to which the wireless device 110 assumes either ACK or NACK, for either the processes according to legacy timing or new timing. For example, the wireless device rule may state whether the wireless device 110 should assume ACK or NACK for a process for which no feedback was received at the expected feedback time. For example, the configuration is that the new timing relation thus the processes of the new timing relation are used, and physical HARQ indication channel (PHICH) is used for feedback transmissions for these processes. The processes acting according to the legacy timing may not get any feedback at the first feedback occasion after the transition, and wireless device 110 may assume ACK for those. The regular feedback for those is transmitted later on, when the processes also act according to the new timing relation.

Figure 4:
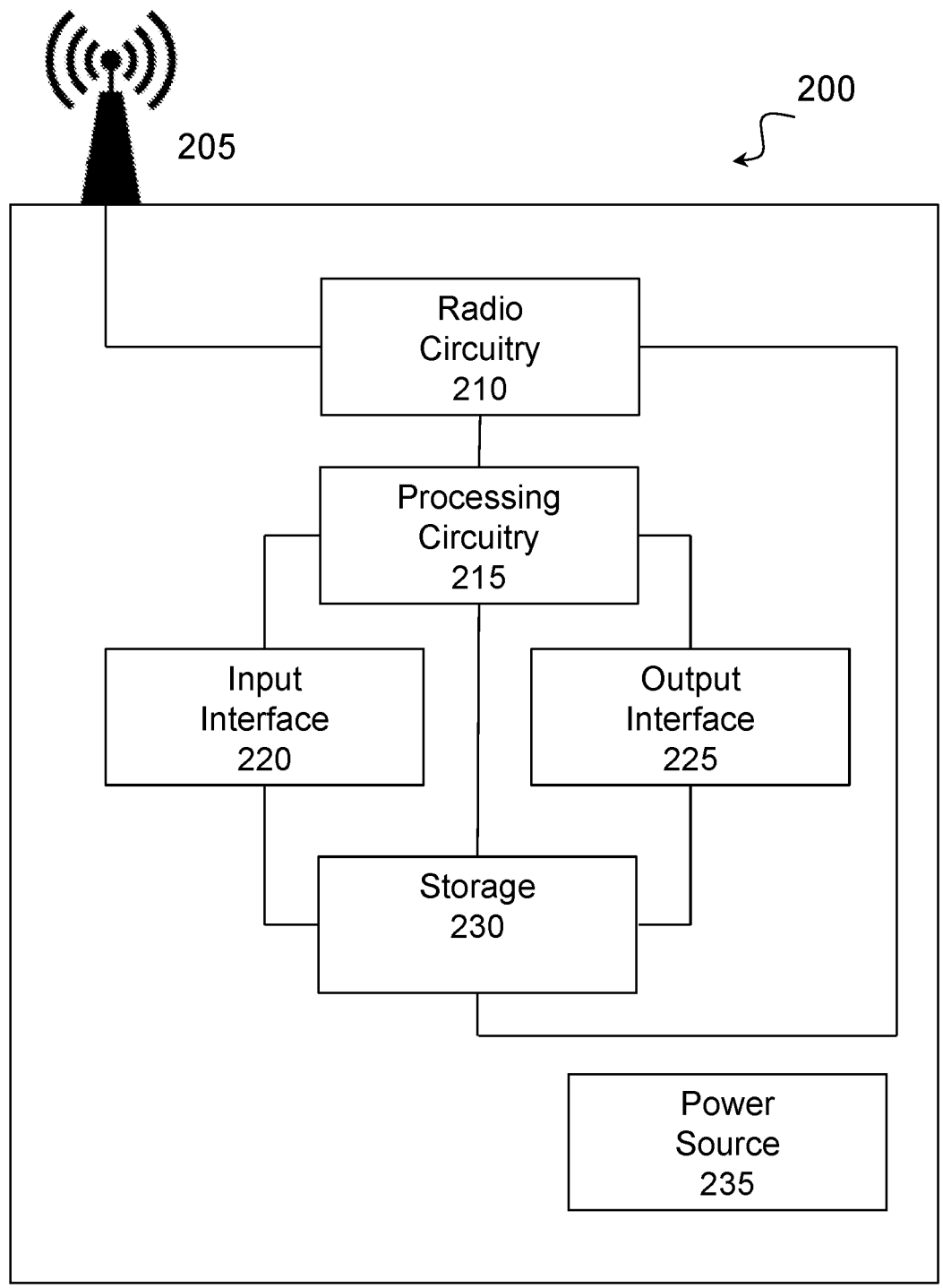
FIG. 4 illustrate an example wireless device for synchronous control of timing configurations, in accordance with certain embodiments.

FIG. 4 illustrates an example user equipment 200 for synchronous control of timing configurations, in accordance with certain embodiments. As shown in FIG. 4, user equipment 200 is an example wireless device such as wireless device 110. UE 200 includes an antenna 205, radio front-end circuitry 210, processing circuitry 215, and a computer-readable storage medium 230. Antenna 205 may include one or more antennas or antenna arrays, and is configured to send and/or receive wireless signals, and is connected to radio front-end circuitry 210. In certain alternative embodiments, wireless device 200 may not include antenna 205, and antenna 205 may instead be separate from wireless device 200 and be connectable to wireless device 200 through an interface or port.

The radio front-end circuitry 210 may comprise various filters and amplifiers, is connected to antenna 205 and processing circuitry 215, and is configured to condition signals communicated between antenna 205 and processing circuitry 215. In certain alternative embodiments, wireless device 200 may not include radio front-end circuitry 210, and processing circuitry 215 may instead be connected to antenna 205 without radio front-end circuitry 210.

Processing circuitry 215 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 215 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 215 executing instructions stored on a computer-readable storage medium 230. In alternative embodiments, some or all of the functionality may be provided by the processing circuitry 215 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 215 alone or to other components of UE 200, but are enjoyed by the wireless device as a whole, and/or by end users and the wireless network generally.

Antenna 205, radio front-end circuitry 210, and/or processing circuitry 215 may be configured to perform any receiving operations described herein as being performed by a wireless device. Any information, data and/or signals may be received from a network node and/or another wireless device.

The processing circuitry 215 may be configured to perform any determining operations described herein as being performed by a wireless device. Determining as performed by processing circuitry 215 may include processing information obtained by the processing circuitry 215 by, for example, converting the obtained information into other information, comparing the obtained information or converted information to information stored in the wireless device, and/or performing one or more operations based on the obtained information or converted information, and as a result of said processing making a determination.

Antenna 205, radio front-end circuitry 210, and/or processing circuitry 215 may be configured to perform any transmitting operations described herein as being performed by a wireless device. Any information, data and/or signals may be transmitted to a network node and/or another wireless device.

Computer-readable storage medium 230 is generally operable to store instructions, such as a computer program, software, an application including one or more of logic, rules, code, tables, etc. and/or other instructions capable of being executed by a processor. Examples of computer-readable storage medium 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 215. In some embodiments, processing circuitry 215 and computer-readable storage medium 230 may be considered to be integrated.

Alternative embodiments of UE 200 may include additional components beyond those shown in FIG. 4 that may be responsible for providing certain aspects of the UE's functionality, including any of the functionality described herein and/or any functionality necessary to support the solution described above. As just one example, UE 200 may include input interfaces, devices and circuits, and output interfaces, devices and circuits. Input interfaces, devices, and circuits are configured to allow input of information into UE 200, and are connected to processing circuitry 215 to allow processing circuitry 215 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 200, and are connected to processing circuitry 215 to allow processing circuitry 215 to output information from UE 200. For example, output interfaces, devices, or circuits may include a speaker, a display, vibrating circuitry, a USB port, a headphone interface, or other output elements. Using one or more input and output interfaces, devices, and circuits, UE 200 may communicate with end users and/or the wireless network, and allow them to benefit from the functionality described herein.

As another example, UE 200 may include power source 235. Power source 235 may comprise power management circuitry. Power source 235 may receive power from a power supply, which may either be comprised in, or be external to, power source 235. For example, UE 200 may comprise a power supply in the form of a battery or battery pack which is connected to, or integrated in, power source 235. Other types of power sources, such as photovoltaic devices, may also be used. As a further example, UE 200 may be connectable to an external power supply (such as an electricity outlet) via an input circuitry or interface such as an electrical cable, whereby the external power supply supplies power to power source 235. Power source 235 may be connected to radio front-end circuitry 210, processing circuitry 215, and/or computer-readable storage medium 230 and be configured to supply UE 200, including processing circuitry 215, with power for performing the functionality described herein.

UE 200 may also include multiple sets of processing circuitry 215, computer-readable storage medium 230, radio circuitry 210, and/or antenna 205 for different wireless technologies integrated into wireless device 200, such as, for example, GSM, WCDMA, LTE, NR, WiFi, or Bluetooth wireless technologies. These wireless technologies may be integrated into the same or different chipsets and other components within wireless device 200.

Figure 5:
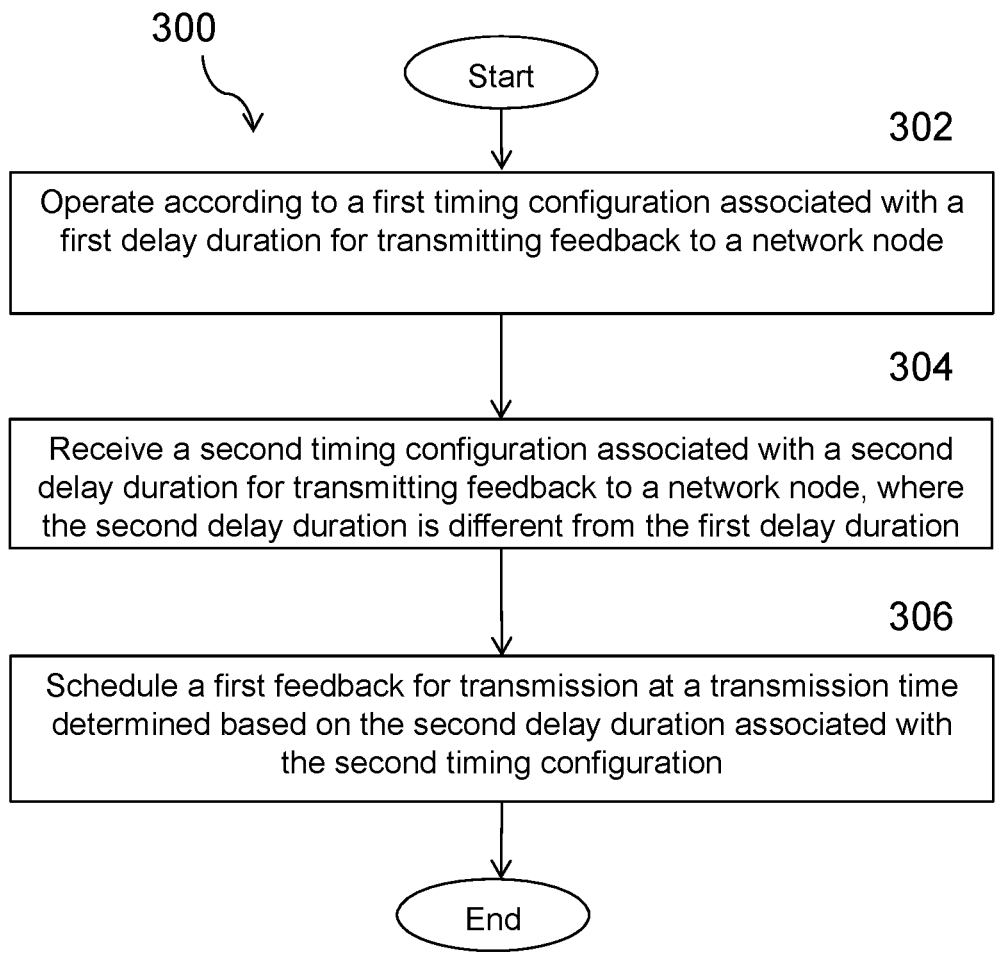
FIG. 5 illustrates an example method by a wireless device for synchronous control of timing configurations, in accordance with certain embodiments.

FIG. 5 illustrates an exemplary method 300 for synchronous control of timing configurations by a wireless device 110, which may include UE 300, according to certain embodiments. The method begins at step 302, when wireless device 110 operates according to a first timing configuration associated with a first delay duration for transmitting feedback to a network node 115.

At step 304, wireless device 110 receives from network node 115 a second timing configuration associated with a second delay duration for transmitting feedback to the network node 115. According to certain embodiments, the second delay duration is different from the first delay duration.

In particular embodiments, either or both of the first timing configuration and the second timing configuration may be received by wireless device 110 as any one of a UE-specific identity on a downlink control channel; a UE common identity on a downlink control channel; a special format of Downlink Control Information; and/or a control field or header in downlink packet data unit.

According to certain embodiments, the second delay duration may be fewer subframes than the first delay duration. For example, in a particular embodiment, the first delay may include a four subframe delay such that feedback in response to a downlink transmission received in an n subframe is to be transmitted to the network node in an n+4 subframe according to the first configuration. The second delay may include a k subframe delay such that feedback in response to a downlink transmission received in an n subframe is transmitted to the network node in an n+k subframe where k is less than 4.

According to certain embodiments, the second delay duration may be more subframes than the first delay duration. For example, in a particular embodiment, the first delay duration may include a three subframe delay such that feedback in response to a downlink transmission received in an n subframe is to be transmitted to the network node in an n+3 subframe according to the first configuration. The second delay may include a n+k subframe delay such that feedback in response to a downlink transmission received in an n subframe is transmitted to the network node in an n+k subframe where k is more than 4.

At step 306, in response to a first downlink transmission from the network node, wireless device 110 schedules a first feedback for transmission at a transmission time determined based on the second delay duration associated with the second timing configuration. In a particular embodiment, the first feedback may include HARQ feedback indicating a positive ACK or negative ACK of receipt of a HARQ grant.

In a particular embodiment, the transmission of the first feedback may be scheduled according to the second timing configuration in response to receiving, from the network node 115, a second indication requesting activation of the second timing configuration. In response to the second indication, wireless device 110 may activate the second timing configuration for transmitting the first feedback in the uplink transmission at the transmission time determined based on the second delay.

According to certain embodiments, any one of a number of rules may be used to resolve a conflict between the first feedback scheduled according to the second timing configuration and any other feedback also scheduled for transmission at the transmission time according to the first timing configuration. For example, according to a particular embodiment, a priority rule may prioritize the second configuration over the first configuration such that any feedback scheduled according to the first timing configuration should be cancelled. Alternatively, a priority rule may prioritize the first configuration over the second configuration such that the first feedback scheduled according to the second configuration should be cancelled in favor of any feedback scheduled according to the first configuration. As another example, a HARQ process identifier may be received from the network node and the first feedback or the second feedback may be selected for transmission based on the HARQ process identifier. In still another embodiment, the first feedback and the second feedback may be multiplexed together for transmission at the transmission time. In yet another example, it may be determined that the first feedback and the second feedback are both positive acknowledgements and the first feedback may be transmitted to represent both of the first feedback and the second feedback.

According to certain embodiments, the first timing configuration may be considered a default timing configuration, and the first delay duration may comprise a default delay duration. Thus, wireless device 110 may operate in the default configuration until an indication is received from network node 115 that wireless device 110 should operate in the second timing configuration. Operation in the second timing configuration may be temporary such that wireless device 110 may fall back to the default timing configuration when it becomes appropriate. In a particular embodiment, for example, wireless device 110 may operate in the second timing configuration until a second indication is received from network node 115.

In other embodiments, the second timing configuration may be considered a default timing configuration, and the first delay duration may comprise a special delay duration. In this scenario, the method of FIG. 5 may demonstrate the fall back from the special delay duration to the default delay duration.

Figure 6:
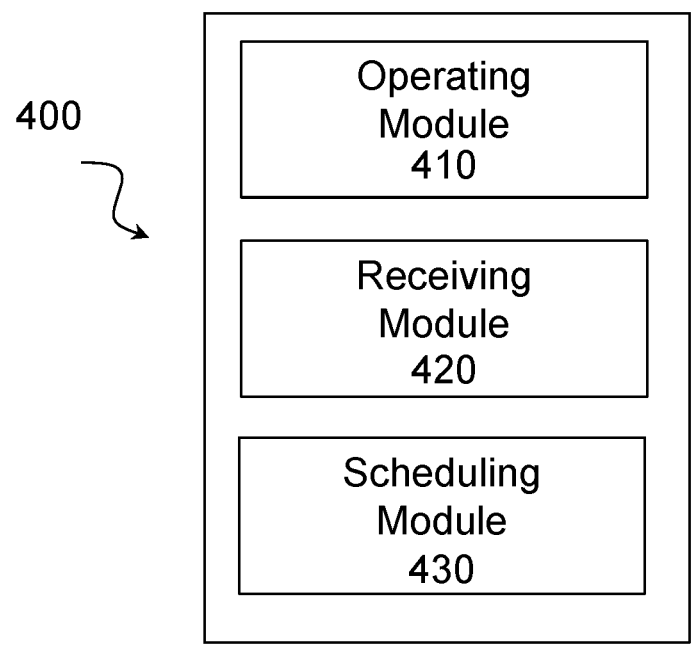
FIG. 6 illustrates an example virtual computing device for synchronous control of timing configurations, in accordance with certain embodiments.

In certain embodiments, the method for synchronous control of timing configurations as described above may be performed by a virtual computing device. FIG. 6 illustrates an example virtual computing device 400 for synchronous control of timing configurations, according to certain embodiments. In certain embodiments, virtual computing device 400 may include modules for performing steps similar to those described above with regard to the method illustrated and described in FIG. 5. For example, virtual computing device 400 may include an operating module 410, a receiving module 420, a scheduling module 430, and any other suitable modules for synchronous control of timing configurations. In some embodiments, one or more of the modules may be implemented using processing circuitry 215 of FIG. 4. In certain embodiments, the functions of two or more of the various modules may be combined into a single module.

The operating module 410 may perform the operating functions of virtual computing device 400. For example, in a particular embodiment, operating module 410 may operate according to a first timing configuration associated with a first delay duration for transmitting feedback to a network node 115.

The receiving module 420 may perform the receiving functions of virtual computing device 400. For example, in a particular embodiment, receiving module 420 may receive from network node 115 a second timing configuration associated with a second delay duration for transmitting feedback to the network node 115. According to certain embodiments, the second delay duration may be different from the first delay duration.

The scheduling module 430 may perform the operating functions of virtual computing device 400. For example, in a particular embodiment, scheduling module 430 may schedule a first feedback for transmission at a transmission time determined based on the second delay duration associated with the second timing configuration.

Other embodiments of virtual computing device 400 may include additional components beyond those shown in FIG. 6 that may be responsible for providing certain aspects of the radio node's functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 7:
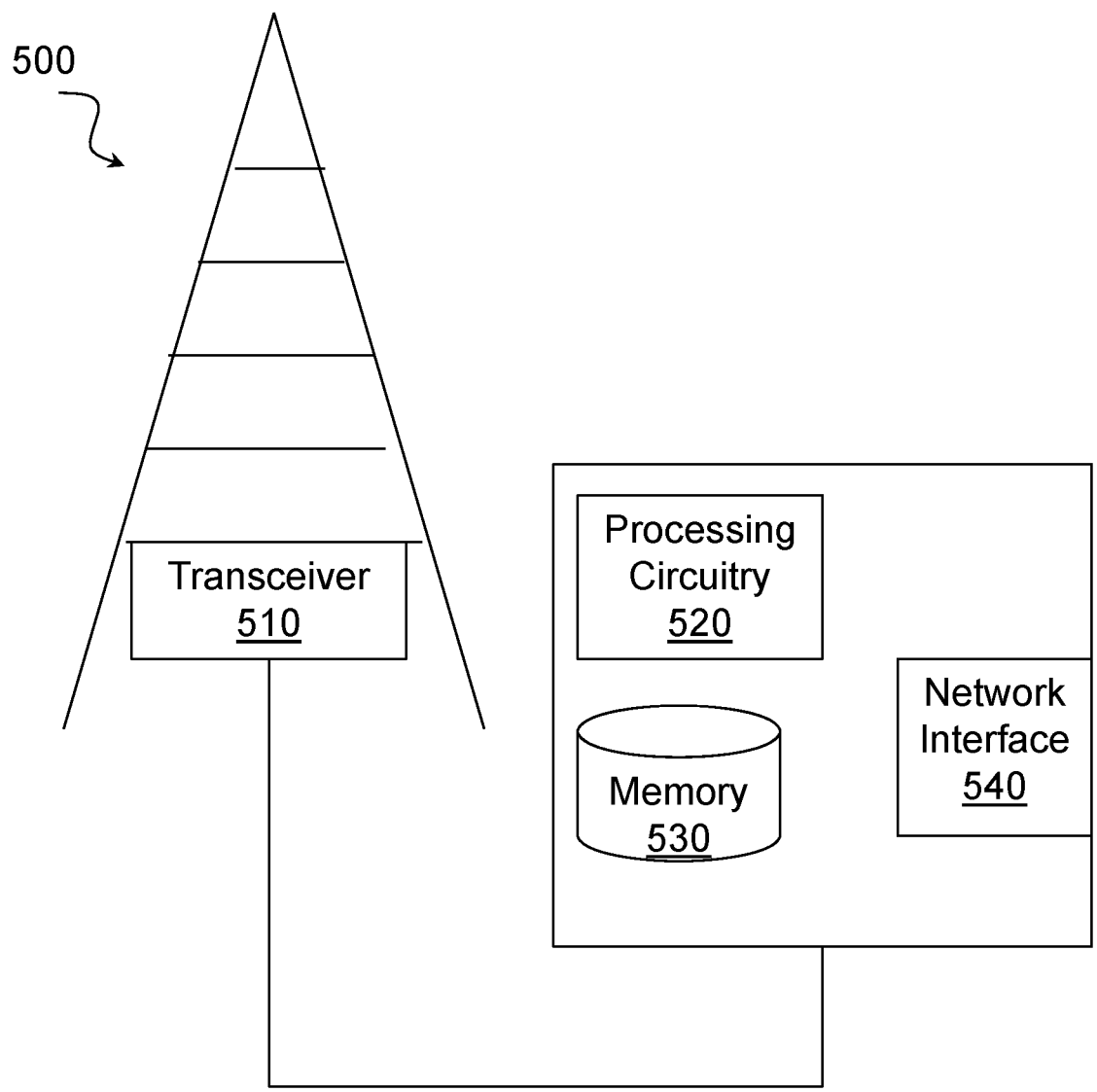
FIG. 7 illustrates an example network node for synchronous control of timing configurations, in accordance with certain embodiments.

FIG. 7 illustrates an example network node 500 for synchronous control of timing configurations, in accordance with certain embodiments. As shown in FIG. 7, network node 500 is an example network node such as network node 115, described above, and may include any type of radio network node or any network node that communicates with a wireless device 110 and/or with another network node 115. Examples of a network node 115 are provided above.

Network nodes 500 may be deployed throughout network 100 as a homogenous deployment, heterogeneous deployment, or mixed deployment. A homogeneous deployment may generally describe a deployment made up of the same (or similar) type of network nodes 500 and/or similar coverage and cell sizes and inter-site distances. A heterogeneous deployment may generally describe deployments using a variety of types of network nodes 500 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 500 may include one or more of transceiver 510, processing circuitry 520, memory 530, and network interface 540. In some embodiments, transceiver 510 facilitates transmitting wireless signals to and receiving wireless signals from wireless device 110 or 300 (e.g., via an antenna), processing circuitry 520 executes instructions to provide some or all of the functionality described above as being provided by a network node 500, memory 530 stores the instructions executed by processing circuitry 520, and network interface 540 communicates signals to backend network components, such as a gateway, switch, router, Internet, Public Switched Telephone Network (PSTN), core network nodes or radio network controllers, etc.

In certain embodiments, network node 500 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processing circuitry 520 may include any suitable combination of hardware and software implemented in one or more modules to execute instructions and manipulate data to perform some or all of the described functions of network node 500. In some embodiments, processing circuitry 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 540 is communicatively coupled to processing circuitry 520 and may refer to any suitable device operable to receive input for network node 500, send output from network node 500, perform suitable processing of the input or output or both, communicate to other devices, or any combination of the preceding. Network interface 540 may include appropriate hardware (e.g., port, modem, network interface card, etc.) and software, including protocol conversion and data processing capabilities, to communicate through a network.

Other embodiments of network node 500 may include additional components beyond those shown in FIG. 7 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 8:
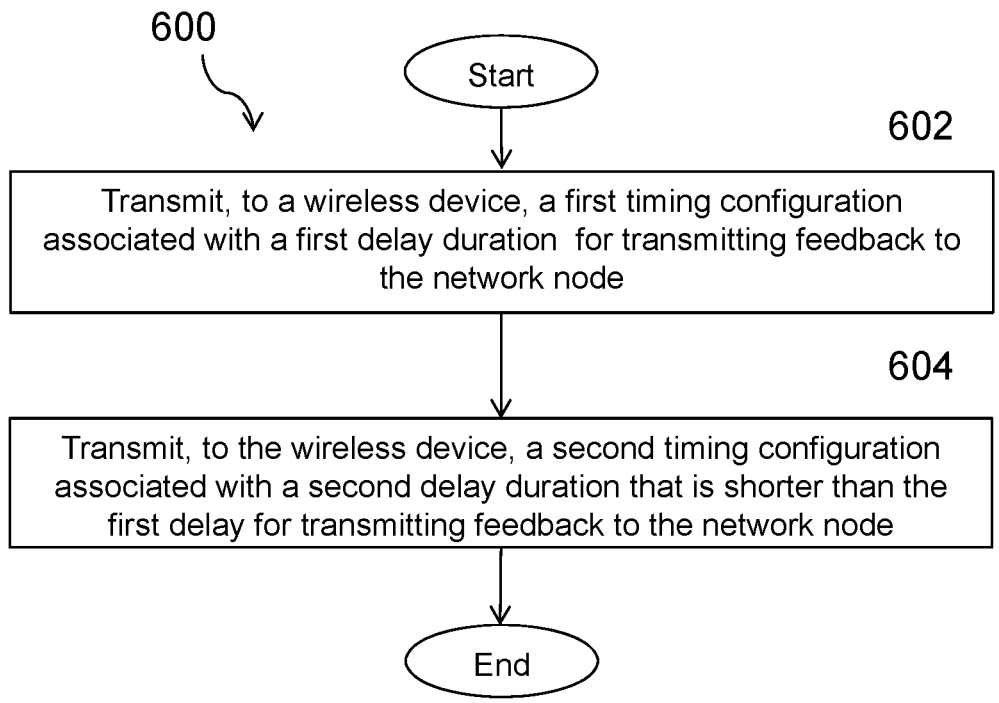
FIG. 8 illustrates another example method by a network node for synchronous control of timing configurations, in accordance with certain embodiments.

FIG. 8 illustrate an exemplary method 600 for synchronous control of timing configurations by a network node 110, which may include UE 300, according to certain embodiments. The method begins at step 602 when network node 115 transmits, to a wireless device 110, a first timing configuration associated with a first delay duration for transmitting feedback to the network node 115.

At step 604, wireless device 110 transmits, to the wireless device 110, a second timing configuration associated with a second delay duration for transmitting feedback to the network node 115. According to certain embodiments, the second delay duration is different from the first delay duration.

In particular embodiments, the first timing configuration and/or the second timing configuration may be transmitted to wireless device 110 as any one of a UE-specific identity on a downlink control channel; a UE common identity on a downlink control channel; a special format of Downlink Control Information; and/or a control field or header in downlink packet data unit.

According to certain embodiments, the second delay duration may be fewer subframes than the first delay duration. For example, in a particular embodiment, the first delay may include a four subframe delay such that feedback in response to a downlink transmission received in an n subframe is to be transmitted to the network node 115 in an n+4 subframe according to the first configuration. The second delay may include a k subframe delay such that feedback in response to a downlink transmission received in an n subframe is transmitted to the network node in an n+k subframe where k is less than 4.

According to certain embodiments, the second delay duration may be more subframes than the first delay duration. For example, in a particular embodiment, the first delay duration may include a three subframe delay such that feedback in response to a downlink transmission received in an n subframe is to be transmitted to the network node 115 in an n+3 subframe according to the first configuration. The second delay may include a n+k subframe delay such that feedback in response to a downlink transmission received in an n subframe is transmitted to the network node in an n+k subframe where k is more than 4.

Thereafter, and according to certain embodiments, network node 115 may then transmit a downlink transmission and receive feedback in response to the downlink transmission. For example, in a particular embodiment, the downlink transmission may include a HARQ grant and the feedback may include HARQ feedback indicating a positive or negative acknowledgement of receipt of the HARQ grant. In a particular embodiment, the first feedback may be scheduled by wireless device 110 according to the second timing configuration in response to receiving, from the network node 115, a second indication requesting activation of the second timing configuration.

According to certain embodiments, network node 115 may also transmit, to the wireless device, one or more rules for resolving a conflict between the first feedback associated with the second timing configuration and a second feedback scheduled for transmission at the transmission time according to the first timing configuration. For example, according to a particular embodiment, network node 115 may transmit a rule that prioritizes the second configuration over the first configuration such that the second feedback scheduled according to the first timing configuration should be cancelled. Alternatively, network node 115 may transmit a rule that prioritize the first configuration over the second configuration such that the first feedback scheduled according to the second configuration should be cancelled. As another example, network node 115 may transmit a HARQ process identifier such that the first feedback or the second feedback may be selected for transmission based on the HARQ process identifier. In still another embodiment, network node 115 may transmit a rule indicating that the first feedback and the second feedback is to be multiplexed together for transmission at the transmission time. In yet another example, network node 115 may transmit a rule that identifies that the first feedback is to represent both the first feedback and the second feedback when both are positive acknowledgements.

According to certain embodiments, the first timing configuration may be considered a default timing configuration, and the first delay duration may comprise a default delay duration. Thus, network node 115 may configure wireless device 110 to operate in the default configuration until an indication is received from network node 115 that wireless device 110 should operate in the second timing configuration. Operation in the second timing configuration may be temporary such that wireless device 110 may fall back to the default timing configuration when network node 115 directs wireless device 110 to do so or when it is otherwise deemed appropriate to do so. In a particular embodiment, for example, network node 115 may transmit a further indication to wireless device 110, directing wireless device 110 to fall back to the first timing configuration.

In other embodiments, the second timing configuration may be considered a default timing configuration, and the first delay duration may comprise a special delay duration. Thus, the method of FIG. 8 may demonstrate a method for configuring wireless device 110 to fall back from the special delay duration to the default delay duration.

Figure 9:
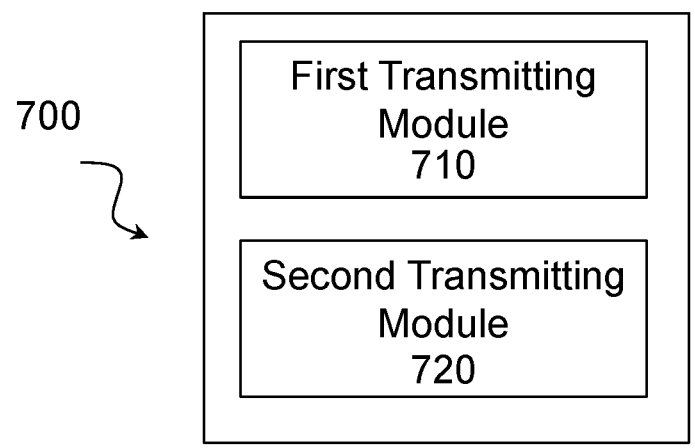
FIG. 9 illustrates another example virtual computing device for synchronous control of timing configurations, in accordance with certain embodiments

In certain embodiments, the method for synchronous control of timing configurations as described above may be performed by a virtual computing device. FIG. 9 illustrates an example virtual computing device 700 for synchronous control of timing configurations, according to certain embodiments. In certain embodiments, virtual computing device 700 may include modules for performing steps similar to those described above with regard to the method illustrated and described in FIG. 8. For example, virtual computing device 700 may include a first transmitting module 710, a second transmitting module 720, and any other suitable modules for synchronous control of timing configurations. In some embodiments, one or more of the modules may be implemented using processor 125 of FIG. 1 or processing circuitry 520 of FIG. 7. In certain embodiments, the functions of two or more of the various modules may be combined into a single module.

The first transmitting module 710 may perform certain of the transmitting functions of virtual computing device 700. For example, in a particular embodiment, transmitting module 710 may transmit, to wireless device 110, a first timing configuration associated with a first delay duration for transmitting feedback to a network node 115.

The second transmitting module 720 may perform certain other of the transmitting functions of virtual computing device 700. For example, in a particular embodiment, second transmitting module 720 may transmit, to wireless device 110, a second timing configuration associated with a second delay duration for transmitting feedback to the network node 115. According to certain embodiments, the second delay duration may be different from the first delay duration.

Other embodiments of virtual computing device 700 may include additional components beyond those shown in FIG. 8 that may be responsible for providing certain aspects of the radio node's functionality, including any of the functionality described above and/or any additional functionality (including any functionality necessary to support the solutions described above). The various different types of radio nodes 115 may include components having the same physical hardware but configured (e.g., via programming) to support different radio access technologies, or may represent partly or entirely different physical components.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 130, storage 150, storage 230, and/or memory 530 may comprise computer readable means on which a computer program can be stored. The computer program may include instructions which cause a processor or processing circuitry (and any operatively coupled entities and devices, such as interfaces and storage) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by the described processors or processing circuitry, possibly in cooperation with storage or memory. Processors, processing circuitry, storage, and/or memory may thus be arranged to allow processors and processing circuitry to fetch instructions from storage or memory and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method by a wireless device for synchronous control of timing configurations:
operating the wireless device according to a first timing configuration associated with a first delay duration for transmitting feedback to a network node, the first timing configuration using a standard transmission time interval (TTI);
receiving, from the network node, a second timing configuration associated with a second delay duration for transmitting feedback to the network node, the second delay duration being different from the first delay duration, the second timing configuration using a shortened TTI that is shorter in duration than the standard TTI;
identifying a conflict between the first feedback scheduled for transmission at the transmission time according to the second timing configuration and a second feedback also scheduled for transmission at the transmission time according to the first timing configuration;
resolving the conflict; and
in response to a first downlink transmission from the network node, scheduling a first feedback for transmission at a transmission time determined based on the second delay duration associated with the second timing configuration using the shortened TTI.

2. The method of claim 1, wherein the first feedback comprises hybrid automatic repeat request (HARQ) feedback indicating positive or negative acknowledgement of receipt of the first down link transmission.

3. The method of claim 1, wherein:
the first delay comprises a four subframe delay such that the first feedback in response to the first downlink transmission being received in an n subframe is to be transmitted to the network node in an n+4 subframe according to the first configuration, and
the second delay comprises a k subframe delay such that the first feedback in response to a first downlink transmission received in an n subframe is transmitted to the network node in an n+k subframe, wherein k is less than 4.

4. The method of claim 1, further comprising transmitting the first feedback at the transmission time determined based on the second delay duration.

5. The method of claim 1, further comprising:
receiving, from the network node, a second indication requesting activation of the second timing configuration; and
in response to the second indication, activating, by the wireless device, the second timing configuration for transmitting the first feedback at the transmission time determined based on the second delay duration.

6. The method of claim 1, wherein the second timing configuration is received by the wireless device as:
a UE-specific identity on a downlink control channel;
a UE common identity on a downlink control channel;
a special format of Downlink Control Information; or
a control field or header in downlink packet data unit.

7. The method of claim 1, wherein
resolving the conflict is by:
applying a priority rule that prioritizes the second timing configuration over the first timing configuration and canceling the second feedback scheduled according to the first timing configuration;

applying a priority rule that prioritizes the first timing configuration over the second timing configuration and canceling the first feedback scheduled according to the second timing configuration;
receiving a HARQ process identifier from the network node and selecting the first feedback or the second feedback for transmission based on the HARQ process identifier;
multiplexing the first feedback and the second feedback together for transmission at the transmission time; or
determining that the first feedback and the second feedback are both positive acknowledgements and transmitting a selected one of the first feedback or the second feedback to represent both the first feedback and the second feedback.

8. A wireless device for synchronous control of timing configurations, the wireless device comprising:
memory storing instructions; and
processing circuitry operable to execute the instructions to cause the wireless device to:
operate according to a first timing configuration associated with a first delay duration for transmitting feedback to a network node, the first timing configuration using a standard transmission time interval (TTI);
receive, from a network node, a second timing configuration associated with a second delay duration for transmitting feedback to the network node, the second delay duration being different from the first delay duration, the second timing configuration using a shortened TTI that is shorter in duration than the standard TTI;
identify a conflict between the first feedback scheduled for transmission at the transmission time according to the second timing configuration and a second feedback also scheduled for transmission at the transmission time according to the first timing configuration;
resolve the conflict; and
in response to a first downlink transmission from the network node, scheduling a first feedback for transmission at a transmission time determined based on the second delay duration associated with the second timing configuration using the shortened TTI.

9. The wireless device of claim 8, wherein the first feedback comprises hybrid automatic repeat request (HARQ) feedback indicating positive or negative acknowledgement of receipt of the first down link transmission.

10. The wireless device of claim 8, wherein the processing circuitry is further operable to execute the instructions to cause the wireless device to transmit the first feedback at the transmission time determined based on the second delay duration.

11. The wireless device of claim 8, wherein the processing circuitry operable is further operable to execute the instructions to cause the wireless device to:
receive, from the network node, a second indication requesting activation of the second timing configuration; and
in response to the second indication, activate the second timing configuration for transmitting the first feedback at the transmission time determined based on the second delay duration.

12. The wireless device of claim 8, wherein the second timing configuration is received by the wireless device as:
a UE-specific identity on a downlink control channel;
a UE common identity on a downlink control channel;
a special format of Downlink Control Information; or a control field or header in downlink packet data unit.

13. The wireless device of claim 8, wherein prior to transmitting the first feedback, the processing circuitry operable is further operable to execute the instructions to cause the wireless device to:
resolve the conflict by:
applying a priority rule that prioritizes the second timing configuration over the first timing configuration and canceling the second feedback scheduled according to the first timing configuration;
applying a priority rule that prioritizes the first timing configuration over the second timing configuration and canceling the first feedback scheduled according to the second timing configuration;
receiving a HARQ process identifier from the network node and selecting the first feedback or the second feedback for transmission based on the HARQ process identifier;
multiplexing the first feedback and the second feedback together for transmission at the transmission time; or
determining that the first feedback and the second feedback are both positive acknowledgements and transmitting a selected one of the first feedback or the second feedback to represent both the first feedback and the second feedback.

14. A method by a network node for synchronous control of timing configurations, the method comprising:
transmitting, to a wireless device, a first timing configuration associated with a first delay duration for transmitting feedback to the network node, the first timing configuration using a standard transmission time interval (TTI);
transmitting, to the wireless device, a second timing configuration associated with a second delay duration for transmitting feedback to the network node, the second delay duration being different than the first delay duration for transmitting feedback, the second timing configuration using a shortened TTI that is shorter in duration than the standard TTI;
transmitting, to the wireless device, a second indication requesting activation of the second timing configuration;
transmitting, to the wireless device, a rule for resolving a conflict between a first feedback scheduled for transmission at a transmission time according to the first timing configuration and a second feedback scheduled for transmission at the transmission time according to the second timing configuration; and
receiving a first feedback at the transmission time determined based on the second delay duration associated with the second timing configuration after the second indication is transmitted to the wireless device.

15. The method of claim 14, further comprising:
transmitting, to the wireless device, a downlink transmission comprising a HARQ grant, and
wherein the first feedback comprises hybrid automatic repeat request (HARQ) feedback indicating a positive or negative acknowledgement of receipt of the HARQ grant.

16. The method of claim 14, wherein:
the first delay duration comprises a four subframe delay such that feedback in response to a downlink transmission received in an n subframe is to be transmitted to the network node in an n+4 subframe according to the first configuration, and the second delay duration comprises a k subframe delay such that feedback in response to a downlink transmission received in an n subframe is transmitted to the network node in an n+k subframe,
wherein k is less than 4.

17. The method of claim 14, further comprising receiving a first feedback at a transmission time determined based on the second delay duration associated with the second timing configuration.

18. The method of claim 14, wherein the second timing configuration is transmitted to the wireless device as:
   a UE-specific identity on a downlink control channel;
   a UE common identity on a downlink control channel;
   a special format of Downlink Control Information; or
   a control field or header in downlink packet data unit.

19. The method of claim 14,
wherein the rule comprises:
   a first rule that prioritizes the second timing configuration over the first timing configuration such that the first feedback scheduled according to the first timing configuration should be cancelled by the wireless device;
   a second rule that prioritizes the first timing configuration over the second timing configuration such that the second feedback scheduled according to the second timing configuration should be cancelled by the wireless device;
   a third rule that includes a HARQ process identifier such that the wireless device should select the first feedback or the second feedback for transmission based on the HARQ process identifier;
   a fourth rule identifying that the first feedback and the second feedback is to be multiplexed together for transmission at the transmission time; or
   a fifth rule that identifies that a selected one of the first feedback and the second feedback is to represent both the first feedback and the second feedback when both are positive acknowledgements.

20. The method of claim 14, further comprising:
while the wireless device is operating according to the first configuration, transmitting a first downlink grant, wherein transmitting the downlink grant is delayed by at least one subframe if the first downlink grant was scheduled for an n−1 subframe;
while the wireless device is operating according to the second configuration, transmitting a second downlink grant in a n subframe,
wherein the first feedback is received in a n+k subframe that is determined based on the second delay associated with the second timing configuration.

21. A network node for synchronous control of timing configurations, the network node comprising:
memory storing instructions; and
processing circuitry operable to execute the instructions to cause the network node to:
   transmit, to a wireless device, a first timing configuration associated with a first delay duration for transmitting feedback to the network node, the first timing configuration using a standard transmission time interval (TTI);
   transmit, to the wireless device, a second timing configuration associated with a second delay duration for transmitting feedback to the network node, wherein the second delay duration is different than the first delay duration, the second timing configuration using a shortened TTI that is shorter in duration than the standard TTI;
   transmit, to the wireless device, a second indication requesting activation of the second timing configuration;
   transmit, to the wireless device, a rule for resolving a conflict between a first feedback scheduled for transmission at a transmission time according to the first timing configuration and a second feedback scheduled for transmission at the transmission time according to the second timing configuration; and
   receive a first feedback at the transmission time determined based on the second delay duration associated with the second timing configuration after the second indication is transmitted to the wireless device.

22. The network node of claim 21, wherein the processing circuitry is further operable to execute the instructions to cause the network node to:
   transmit, to the wireless device, a downlink transmission comprising a HARQ grant, and
   wherein the first feedback comprises hybrid automatic repeat request (HARQ) feedback indicating a positive or negative acknowledgement of receipt of the HARQ grant.

23. The network node of claim 21, wherein the processing circuitry is further operable to execute the instructions to cause the network node to receive a first feedback at a transmission time determined based on the second delay duration associated with the second timing configuration.

24. The network node of claim 21, wherein the second timing configuration is transmitted to the wireless device as:
   a UE-specific identity on a downlink control channel;
   a UE common identity on a downlink control channel;
   a special format of Downlink Control Information; or
   a control field or header in downlink packet data unit.

25. The network node of claim 21,
wherein the rule comprises:
   a first rule that prioritizes the second timing configuration over the first timing configuration such that the first feedback scheduled according to the first timing configuration should be cancelled by the wireless device;
   a second rule that prioritizes the first timing configuration over the second timing configuration such that the second feedback scheduled according to the second timing configuration should be cancelled by the wireless device;
   a third rule that includes a HARQ process identifier such that the wireless device should select the first feedback or the second feedback for transmission based on the HARQ process identifier;
   a fourth rule identifying that the first feedback and the second feedback is to be multiplexed together for transmission at the transmission time; or
   a fifth rule that identifies that a selected one of the first feedback and the second feedback is to represent both the first feedback and the second feedback when both are positive acknowledgements.

26. The network node of claim 21, wherein the processing circuitry is further operable to execute the instructions to cause the network node to:
   while the wireless device is operating according to the first configuration, transmit a first downlink grant, wherein transmitting the downlink grant is delayed by at least one subframe if the first downlink grant was scheduled for an n−1 subframe;
   while the wireless device is operating according to the second configuration, transmit a second downlink grant in a n subframe, wherein the first feedback is received in a n+k subframe that is determined based on the second delay associated with the second timing configuration.

\* \* \* \* \*